3,375,269
**16-OXYGENATED-Δ³-A-NORANDROSTENE-
2,17-DIONES**
Pacifico A. Principe, South River, and Seymour D. Levine, Princeton, N.J., assignors, by mesne assignments, to E. R. Squibb & Sons, Inc., New York, N.Y., a corporation of Delaware
No Drawing. Filed Aug. 30, 1965, Ser. No. 483,812
5 Claims. (Cl. 260—488)

This invention relates to and has as its object the provision of novel physiologically active steroids and methods for their production.

More particularly, this invention relates to the production of compounds of the formula

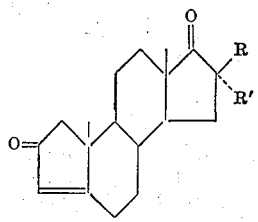

R is hydrogen; R' is selected from the group consisting of hydroxy and acyloxy; and together R and R' is oxo (O=).

The preferred acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The compounds of the instant invention are physiologically active steroids which possess anti-androgenic activity, i.e., they inhibit the action of androgens, and they may be used in the treatment of such conditions as hyperandrogenic acne. The compounds may be formulated for such administration, the concentration and/or dosage being based on the activity of the particular compound and the requirements of the patient.

The novel compounds of this invention may be prepared according to the process of this invention by employing as the starting material Δ³-A-norandrostene-2,17-dione.

The novel compounds of the instant invention may be prepared from the starting material by subjecting the latter to the action of the enzymes of *Streptomyces roseochromogenes* under oxidizing and preferably areobic conditions. The oxidation can best be effected by either including the starting material in an aerobic culture of the microorganism, or by bringing together, in an aqueous medium, the compounds, air, and enzymes of non-proliferating cells of the microorganism.

In general, the conditions of culturing the microorganism for the purposes of this invention are (except for the inclusion of the starting material to be converted) the same as those of culturing microorganisms for the production of antibiotics, i.e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch, or dextrin), a fatty acid, a fat and/or the compound itself. Preferably, however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fatty acids utilizable for the purpose of this invention are: stearic acid, palmitic acid, oleic acid, linoleic acid, and myristic acid.

The source of nitrogenous factors may be organic (e.g., soybean meal, corn steep liquor, meat extract and/or distillers solubles) or synthetic (i.e., composed of simple, synthesizable organic or inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of concentration of the starting material is about 0.01 to 0.10%. The culture period (or rather the time of subjecting the compound to the action of the enzyme) may vary considerably, the range of about six to ninety-six hours being feasible, but not limiting.

The process yields, inter alia, Δ³-A-norandrostene-16α-ol-2,17-dione. The Δ³-A-norandrostene-16α-ol-2,17-dione can be esterified in the usual manner, as by treatment with the desired acid anhydride or acyl halide in an organic solvent (preferably in an organic base such as pyridine) to yield the 16α-ester derivative, or it may be oxidized to yield the 16-keto derivative.

The following examples are illustrative of the invention:

*Example 1.—16α-hydroxy-Δ³-A-norandrostene-2,17-dione*

(a) *Fermentation.*—Surface growth from each of 2-two-week old agar slants of *Streptomyces roseochromogenes* (ATCC 13400), the slants containing as a nutrient medium (A):

| | Grams |
|---|---|
| Glucose | 10 |
| Yeast extract | 2.5 |
| K₂HPO₄ | 1 |
| Agar | 20 |

Distilled water to one liter.

is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

| | Grams |
|---|---|
| Glucose | 30 |
| Soybean meal | 20 |
| Soybean oil | 2.2 |
| CaCO₃ | 2.5 |

Distilled water to one liter.

After 72 hours' incubation at 25° with continuous rotary agitation (280 cycles/minutes; two inch radius) 10% (vol./vol.) transfers are made to thirty-four 250 ml. Erlenmeyer flasks each containing 50 ml. of freshly sterilized medium B. After 24 hours of fourther incubation, using the same conditions as described above, the steroid (300 micrograms/ml.) is added by supplementing each flask with 0.25 ml. of a sterile solution (60 mg./ml.) of Δ³-A-norandrostene-2,17-dione in N,N-dimethylformamide. A total of 510 mg. is fermented. After 72 hours of further incubation, using identical conditions as described above, the contents of the flasks are pooled and the broth is adjusted to pH 4.5 using 12 N H₂SO₄. The acidified broth is then filtered through a Seitz clarifying pad. The flasks, mycelium and pad are washed with successive 50 ml. portions of warm water. The combined filtrate and washings have a volume of 1650 ml.

(b) *Isolation.*—The thus obtained filtrate is extracted three times with chloroform. The chloroform extracts are washed three times with water, dried over sodium sulfate and evaporated to dryness. The residue is crystallized from methanol-isopropyl ether to give about 315 mg. of 16α-hydroxy-Δ³-A-norandrostene-2,17-dione having a melting point of about 198–200°. The analytical sample is prepared by recrystallization from chloroformisopropyl ether, M.P. about 199.5–200.5°; $[\alpha]_D^{28}$ +41° (EtOH); $\lambda^{KBr}$ 2.95, 5.72, 6.00 and 6.20μ; $\lambda^{EtOH}$ 233 mμ (16,000);

$\tau_{CDCl_3}^{TMS}$ 8.99 (s, 18-Me), 8.80 (s, 19-Me), 5.61 (q, J-3 c.p.s., 5.5 c.p.s., 16β-H) and 4.25 (s, 3-H)

*Analysis.*—Calcd. for $C_{18}H_{24}O_3$ (288.37): C, 74.97; H, 8.39. Found: C, 74.88; H, 8.50.

*Example 2.—16α-acetoxy-Δ³-A-norandrostene-2,17-dione*

A mixture of 35 mg. of 16α-hydroxy-Δ³-A-norandrostene-2,17-dione, 0.25 ml. of acetic anhydride and 0.5 ml. of pyridine is left at room temperature for four hours, diluted with water and extracted three times with ether. The ether extracts are washed with a saturated sodium bicarbonate solution, 8% salt solution, dried over sodium sulfate and evaporated to dryness. The residue is crystallized from ether-isopropyl ether to give about 21 mg. of 16α-acetoxy-Δ³-A-norandrostene-2,17-dione having a melting point of about 158–160°. The analytical sample is prepared by recrystallization from ether-isopropyl ether, M.P. about 161–162°; $[\alpha]_D^{26}$ +37° (EtOH); $\lambda^{KBr}$ 5.74, 5.90 and 6.17μ; $\lambda^{EtOH}$ 232 mμ (16,300);

$\tau_{CDCl_3}^{TMS}$ 8.97 (s, 18-Me), 8.80 (s, 19-Me), 7.89 (s, 16α-acetate), 4.58 (d, d, J=2.5, 8 c.p.s., 16β-H) and 4.24 (s, 3-H)

*Analysis.*—Calcd. for $C_{20}H_{26}O_4$ (330.41): C, 72.70; H, 7.93. Found: C, 72.80; H, 7.91.

Similarly, by substituting other acylating agents such as propionic anhydride and benzoyl chloride, for the acetic anhydride, the corresponding esters are formed.

*Example 3.—Δ³-A-norandrostene-2,16,17-trione*

A solution of 50 mg. of 16α-hydroxy-Δ³-A-norandrostene-2,17-dione in 9 ml. of acetone is treated dropwise with an equivalent amount of chromium trioxide-sulfuric acid. The chromic sulfate is removed by filtration, and washed with additional acetone. The filtrate is concentrated, diluted with water and extracted with chloroform. The chloroform extracts are washed with 8% salt solution, dried over sodium sulfate and evaporated to dryness to give Δ³-A-norandrostene-2,16,17-trione.

The invention may be variously otherwise embodied within the scope of the appended claims.

What is claimed is:
1. A compound of the formula

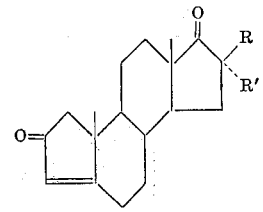

wherein R is hydrogen; R' is selected from the group consisting of hydroxy and the acyloxy radical of a hydrocarbon carboxylic acid of less than twelve carbon atoms; and together R and R' is oxo.

2. 16α-hydroxy-Δ³-A-norandrostene-2,17-dione.
3. A lower alkanoic acid ester of 16α-hydroxy-Δ³-A-norandrostene-2,17-dione.
4. 16α-acetoxy-Δ³-A-norandrostene-2,17-dione.
5. Δ³-A-norandrostene-2,16,17-trione.

References Cited

UNITED STATES PATENTS 3,210,406  10/1965  Weisenborn _____ 260—488
3,294,834  12/1966  Fried et al. _____ 260—488

LORRAINE A. WEINBERGER, *Primary Examiner.*

V. GARNER, *Assistant Examiner.*